(12) United States Patent
Kondo et al.

(10) Patent No.: US 8,717,697 B1
(45) Date of Patent: May 6, 2014

(54) CONTROLLER, DISK DRIVE, AND READ-BACK SIGNAL PROCESSING METHOD

(71) Applicant: Kabushiki Kaisha Toshiba, Tokyo (JP)

(72) Inventors: Yosuke Kondo, Kanagawa (JP); Kohsuke Harada, Kanagawa (JP); Kenji Yoshida, Kanagawa (JP); Akihiro Yamazaki, Kanagawa (JP); Kazuhito Ichihara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/799,082

(22) Filed: Mar. 13, 2013

(30) Foreign Application Priority Data

Dec. 28, 2012 (JP) ................................ 2012-288005

(51) Int. Cl.
*G11B 20/10* (2006.01)
*G11B 20/18* (2006.01)

(52) U.S. Cl.
USPC ......... 360/39; 360/65; 369/53.35; 369/59.15; 369/59.22; 369/47.17; 369/124.01

(58) Field of Classification Search
None
See application file for complete search history.

(56) References Cited

U.S. PATENT DOCUMENTS

| 5,790,492 | A | * | 8/1998 | Umezawa et al. | 369/53.33 |
| 6,909,566 | B1 | * | 6/2005 | Zaitsu et al. | 360/48 |
| 7,031,090 | B2 | | 4/2006 | Ichihara et al. | |
| 7,729,071 | B2 | | 6/2010 | Harada | |
| 2002/0131351 | A1 | * | 9/2002 | Taguchi et al. | 369/47.17 |
| 2006/0092803 | A1 | * | 5/2006 | Tatsuzawa et al. | 369/59.22 |
| 2009/0073822 | A1 | * | 3/2009 | Kayanuma | 369/44.13 |
| 2013/0215528 | A1 | * | 8/2013 | Okubo et al. | 360/53 |

FOREIGN PATENT DOCUMENTS

| JP | 06-223307 A | 8/1994 |
| JP | 2002-367291 A | 12/2002 |
| JP | 2008-159184 A | 7/2008 |

* cited by examiner

*Primary Examiner* — Thang Tran
(74) *Attorney, Agent, or Firm* — Posz Law Group, PLC

(57) ABSTRACT

According to one embodiment, there is provided a controller including an interference cancelling module, a boosting module, and a decoding module. The interference cancelling module generates a first correction signal by cancelling an interference component from an adjacent track in a signal read from a target track of a disk medium. The boosting module generates a second correction signal by boosting a low frequency component of a signal corresponding to the first correction signal. The decoding module decodes a signal based on the second correction signal.

19 Claims, 7 Drawing Sheets

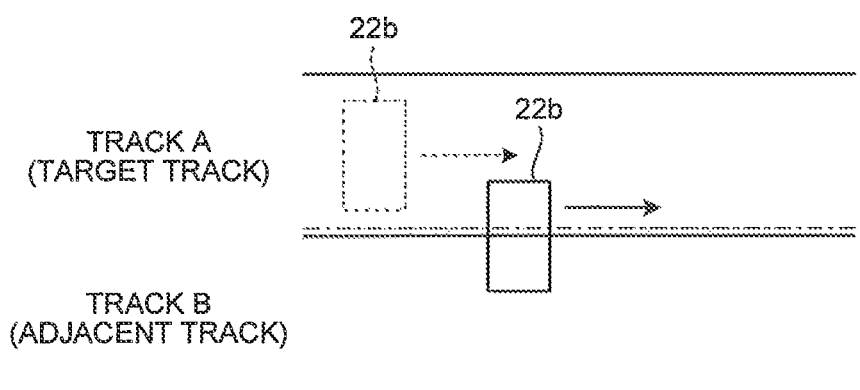
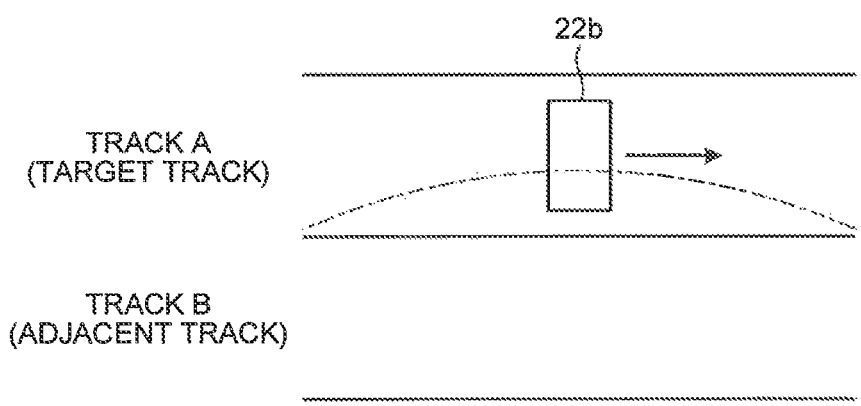

CONTROLLER, DISK DRIVE, AND READ-BACK SIGNAL PROCESSING METHOD

CROSS-REFERENCE TO RELATED APPLICATIONS

This application is based upon and claims the benefit of priority from Japanese Patent Application No. 2012-288005, filed on Dec. 28, 2012; the entire contents of which are incorporated herein by reference.

FIELD

Embodiments described herein relate generally to a controller, a disk drive, and a read-back signal processing method.

BACKGROUND

Recently, in disk drives such as hard disks, density of data stored in magnetic media tends to increase. In accordance with this, track pitch of the magnetic media tends to be narrow. When data is read from a magnetic medium having a narrow track pitch using a magnetic read/write head, in a case where off-track occurs in the track width direction, there is a possibility that data written on a corresponding track cannot be accurately read.

In addition, in a case where off-track occurs in the track width direction at the time of writing data onto a magnetic medium having a narrow track pitch using a magnetic read/write head, thereafter, when data is read using a magnetic read/write head, there is a possibility that the data written on the track cannot be accurately read.

BRIEF DESCRIPTION OF THE DRAWINGS

FIG. 2 is a diagram that illustrates the operation of the disk drive according to the first embodiment;

FIG. 3 is a diagram that illustrates the operation of the disk drive according to the first embodiment;

DETAILED DESCRIPTION

In general, according to one embodiment, there is provided a controller including an interference cancelling module, a boosting module, and a decoding module. The interference cancelling module generates a first correction signal by cancelling an interference component from an adjacent track in a signal read from a target track of a disk medium. The boosting module generates a second correction signal by boosting a low frequency component of a signal corresponding to the first correction signal. The decoding module decodes a signal based on the second correction signal.

Exemplary embodiments of a controller, a disk drive, and a read-back signal processing method will be explained below in detail with reference to the accompanying drawings. The present invention is not limited to the following embodiments.

First Embodiment

Figure 1:
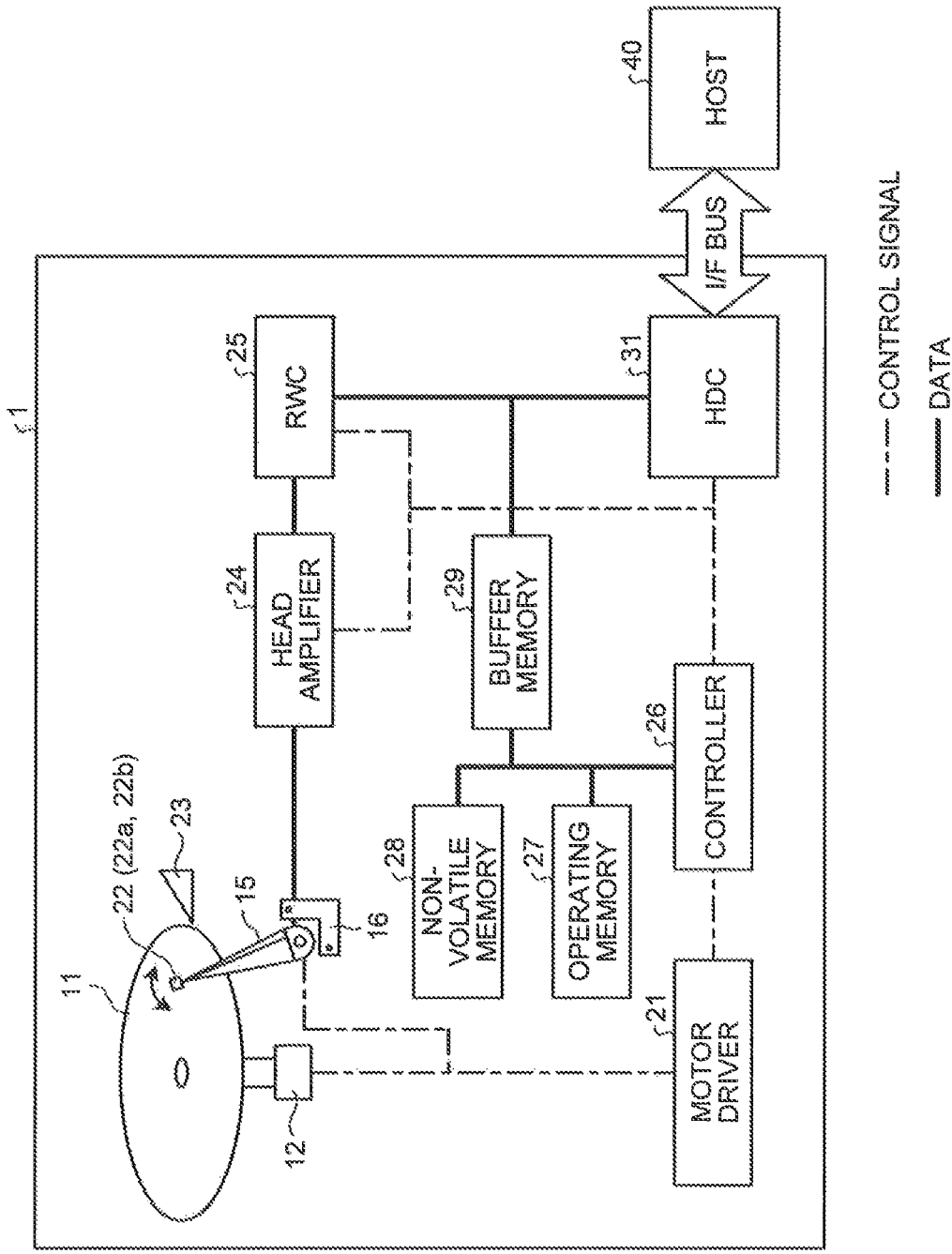
FIG. 1 is a diagram that illustrates the configuration of a disk drive according to a first embodiment.

A disk drive 1 according to a first embodiment will be described with reference to FIG. 1. FIG. 1 is a diagram that illustrates the configuration of the disk drive 1.

The disk drive 1, for example, is a device that records information on a magnetic disk (disk medium) 11 through a magnetic read/write head 22 and reads a signal from the magnetic disk (disk medium) 11 through the magnetic read/write head 22 and, for example, is a magnetic disk drive (for example, a hard disk drive). More specifically, the disk drive 1 includes the magnetic disk 11, a spindle motor 12, a motor driver 21, the magnetic read/write head 22, an actuator arm 15, a voice coil motor (VCM) 16, a ramp 23, a head amplifier 24, a read write channel (RWC) 25, a hard disk controller (HDC) 31, an operation memory 27, a non-volatile memory 28, a buffer memory 29, and a controller 26.

The magnetic disk 11 is rotated around a rotation axis at a predetermined rotation speed by the spindle motor 12. The rotation of the spindle motor 12 is driven by the motor driver 21.

The magnetic read/write head 22 writes/reads data into/from the magnetic disk 11 by using a recording head 22a and reproducing head 22b included therein. In addition, the magnetic read/write head 22 is moved in the radial direction (track width direction) of the magnetic disk 11 at the tip end of the actuator arm 15 by the voice coil motor 16 driven by the motor driver 21. When the rotation of the magnetic disk 11 is being stopped or the like, the magnetic read/write head 22 is retracted on the ramp 23.

The head amplifier 24 amplifies a signal read from the magnetic disk 11 by the magnetic read/write head 22 and outputs the amplified signal, thereby supplying the amplified signal to the read write channel 25. In addition, the head amplifier 24 amplifies a signal used for writing data onto the magnetic disk 11, which has been supplied from the read write channel 25, and supplies the amplified signal to the magnetic read/write head 22.

The hard disk controller 31 performs control of data transmission and data reception with the host computer 40 through an I/F bus, control of the buffer memory 29, a data error correction process for recording data, and the like.

In addition, the buffer memory 29 is used as a cache of data that is transferred between the hard disk controller 31 and the host computer 40. Furthermore, the buffer memory 29 is used for temporarily storing data read from the magnetic disk 11, data to be written onto the magnetic disk 11, control firmware read from the magnetic disk 11, or the like.

The read write channel 25 performs code modulation of data to be written onto the magnetic disk 11, which is supplied from the hard disk controller 31, and supplies the modulated data to the head amplifier 24. In addition, the read write channel 25 performs code demodulation of a signal that is read from the magnetic disk 11 and is supplied from the head amplifier 24 and outputs the demodulated signal to the hard disk controller 31 as digital data.

The operation memory 27 (for example, a static random access memory (SRAM), the non-volatile memory 28 (for example, a flash read only memory (Flash ROM)), and the buffer memory 29 (for example, a dynamic random access memory (DRAM)) for temporary storage are connected to the controller 26. The controller 26 performs overall control of the magnetic disk drive 1 in accordance with firmware stored in the non-volatile memory 28 and the magnetic disk 11 in advance. As the firmware, there are initial firmware and control firmware used for an ordinary operation. For example, the initial firmware which is executed first at the time of start-up is stored in the non-volatile memory 28. In the control firmware, as will be described below, a part of the function of a controller CTR (see FIG. 4) may be included. In addition, the control firmware used for an ordinary operation is recorded on the magnetic disk 11, is read once from the magnetic disk 11 into the buffer memory 29 under the control of the initial firmware, and then, is stored in the operation memory 27.

In the disk drive 1, data is written into a plurality of tracks that are concentrically disposed on the magnetic disk 11 by the recording head 22a, for example, in the order from the inner side to the outer side or in the order from the outer side to the inner side. At this time, the buffer memory 29 temporarily stores data of a track in which the data has been already written. For example, in a case where data is written in the order from the inner side to the outer side, the buffer memory 29 temporarily stores the data of a track at least until writing for a sector of an adjacent track disposed on the outer side is completed.

In the disk drive 1, in order to increase the recording capacity of the magnetic disk 11, in other words, in order to improve the recording density of the magnetic disk 11, the track width (track pitch) of the magnetic disk 11 may be configured to be narrow to the degree of the width of a main magnetic pole of the reproducing head 22b.

For example, as denoted by a dashed line in FIG. 2, a case will be considered in which data has been written into tracks A and B without the recording head 22a being off-track, the reading data from track B has been already completed, and data is read from track A through the reproducing head 22b. In other words, track A is a target track for the current reproduction process, and track B is an adjacent track that is adjacent to the target track.

At this time, in the disk drive 1, the track width of the magnetic disk 11 is narrow to the degree of the width of the main magnetic pole of the reproducing head 22b, and accordingly, there is a case where the reproducing head 22b is off track in the track width direction from a position fitting into the target track (track A) as denoted by broken lines in FIG. 2 to a position shifted to the adjacent track (track B) side as denoted by solid lines in FIG. 2 when reading is performed using the reproducing head 22b. In a case where off-track occurs in the track width direction at the time of reading data, there is a possibility that the reproducing head 22b reads data of the target track (track A) while being interfered with the data of the adjacent track (track B).

In addition, for example, as denoted by a dashed line in FIG. 3, a case will be considered in which data has been written into tracks A and B with the recording head 22a being off-track in the track width direction, the reading data from track B has already been completed, and data is read from track A through the reproducing head 22b. In other words, track A is a target track for the current reproduction process, and track B is an adjacent track that is adjacent to the target track.

At this time, in the disk drive 1, the track width of the magnetic disk 11 is narrow to the degree of the width of the main magnetic pole of the reproducing head 22b. From this, when data is read using the reproducing head 22b, as denoted by solid lines in FIG. 3, even in a case where the reproducing head 22b is at a position fitting into the target track (track A) without being off-track, there is a possibility that the reproducing head 22b is interfered with the data of the adjacent track (track B). In other words, in a case where off-track occurs in the track width direction at the time of writing data, there is a possibility that the reproducing head 22b reads data of the target track (track A) while being interfered with the data of the adjacent track (track B).

Accordingly, in the disk drive 1, an inter-track interference (ITI) cancelling system is employed in which disk is read while an inter-track interference component is eliminated using data of an adjacent track at the time of reading data from the magnetic disk 11. In the ITI cancelling system, for example, data written into an adjacent sector that is adjacent to a reading target sector in the track width direction is read from the buffer memory 29 or the like in advance, and the inter-track interference component is eliminated, for example, by using the data. From this, the interference component in a signal read from the target track, which is applied from the adjacent track, can be cancelled.

However, it has been found in a review made by the inventors of the present invention that original user data is not restorable (uncorrectable) from the signal in which the interference component is cancelled. The reason for this has been reviewed in detail by the inventors. As a result, the reason has been found to be the attenuation of the power amplitude of a low frequency component in the signal, in which the interference signal has been cancelled, from the original level denoted by a broken line due to the influence of the cancellation of the interference component as denoted by a solid line in FIG. 5.

More specifically, when a signal written into track A is represented by $S_A$, and a signal written into track B is represented by $S_B$, it has been understood that a signal S read from the magnetic disk 11 is represented by the following Equation 1.

$$S = S_A + S_B - S_A{\sim} - S_B{\sim} \qquad \text{Equation 1}$$

In Equation 1, $S_A{\sim}$ is a noise component for track A that is not actually present but appears to be virtually present in accordance with an inter-track interference and will be referred to as a noise component of track A. In addition, $S_B{\sim}$ is a noise component for track B that is not actually present but appears to be virtually present in accordance with an inter-track interference and will be referred to as a noise component of track B.

In a case where the cancellation (ITI cancellation) of the inter-track interference component is performed, a signal S' in which the interference component is cancelled can be represented as the following Equation 2 based on Equation 1.

$$S' = S - (S_B - S_B{\sim}) = S_A - S_A{\sim} \qquad \text{Equation 2}$$

Since the reproduction of the adjacent track (track B) has been completed, the signal $S_B$ of the adjacent track (track B) and the noise component $S_B{\sim}$ thereof can be acquired. As represented in Equation 2, a difference therebetween ($S_B - S_B{\sim}$) as an interference component can be subtracted from the signal S read from the magnetic disk 11. On the other hand, the signal $S_A$ of the target track (track A) and the noise component $S_A{\sim}$ are signals requested to be acquired and are difficult to directly acquire.

Figure 5:
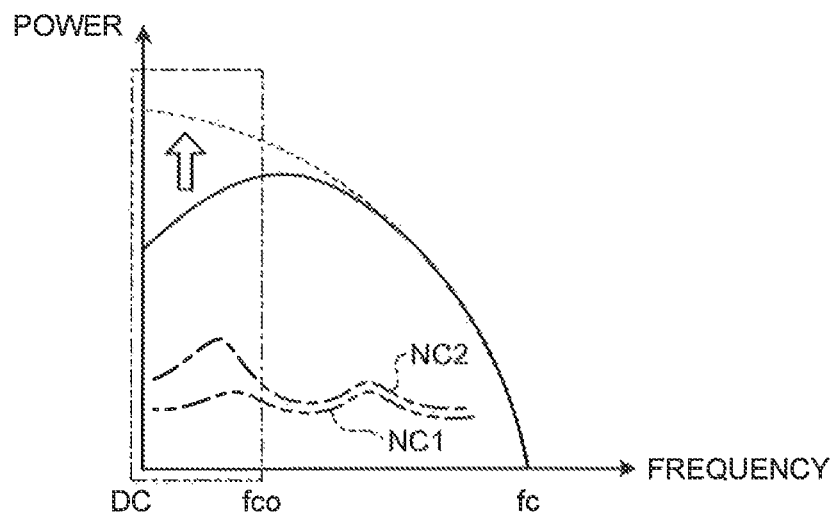
FIG. 5 is a diagram that illustrates the operation of the controller according to the first embodiment.

In other words, as represented in Equation 2, the signal S' in which the interference component has been cancelled, attenuates from the signal $S_A$ written in the track A by the noise component $S_A{\sim}$ of the track A. In other words, the level of the noise component $S_A{\sim}$ of track A tends to be high in the low frequency region, and thus, as illustrated in FIG. 5, it is understood that the power amplitude of the low frequency component in the signal, in which the interference component has been cancelled, attenuates from the original level denoted by the broken line.

From this, even when the cancellation of the inter-track interference component (ITI cancellation) is performed, data written into the track may not be accurately read (uncorrectable).

Thus, the object of this embodiment is to accurately read data written into a track by selectively boosting the low frequency component of a signal in which an interference component has been cancelled in a case where the cancellation of the inter-track interference component (ITI cancellation) is performed. While the cancellation of the inter-track interference component is performed for a signal of a reading target sector of a target track by using a signal of an adjacent sector, which is adjacent to the reading target sector of the adjacent track that has already been reproduced in the track width direction, hereinafter, for the simplification of description, the reading target sector of the target track will be described simply as a target track, and the adjacent sector of the adjacent track will be described simply as an adjacent track.

For example, in the disk drive 1, interference cancellation is performed by subtracting an interference component estimated based on an existing recording series of an interference source from a reproduced waveform after finite impulse response (FIR) equalization of a sector in which inter-track interference occurs. Then, the signal amplitude of a sector that is a reproduction target of which the signal intensity has decreased due to the interference is restored to a predetermined amplitude, and a filtering process is performed in which a variation in the frequency characteristics of the reproduced waveform that occurs due to the reproduction of an inter-track gap is corrected. Then, for the boosting of a noise component occurring due to the restoration of the amplitude and the correction of the frequency characteristics, a noise variance value assumed in generating a metric value (likelihood value) of a Viterbi equalization stage and a noise whitening coefficient (correlation coefficient) assumed in an autoregressive (AR) process are corrected.

Figure 4:
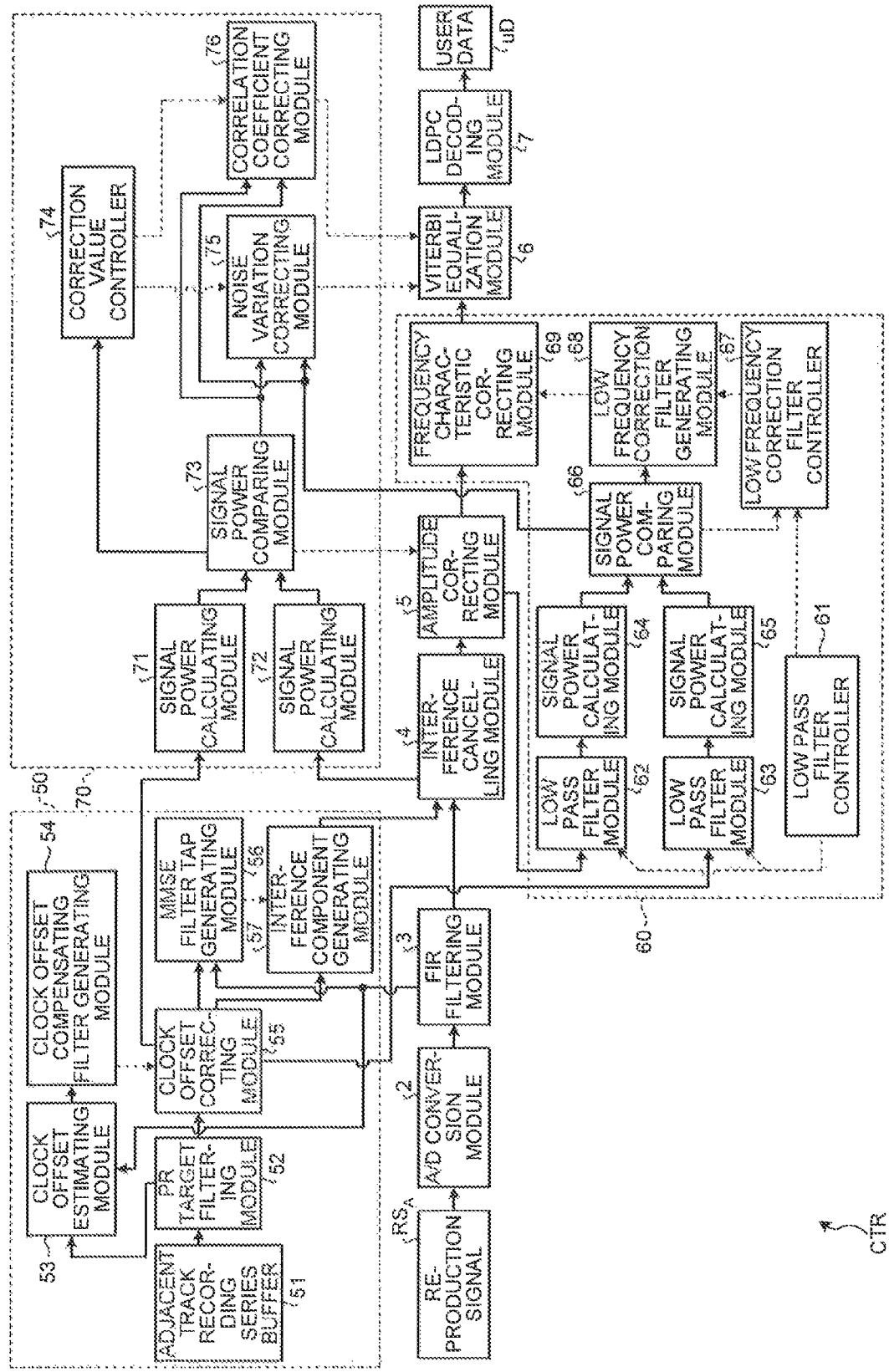
FIG. 4 is a diagram that illustrates the configuration of a controller according to the first embodiment.

More specifically, according to this embodiment, in the disk drive 1, the controller CTR as illustrated in FIG. 4 is realized in terms of functions. FIG. 4 is a diagram that illustrates the configuration of the controller CTR. Here, the controller CTR illustrated in FIG. 4 represents a functional configuration and, for example, may be mounted in the hard disk controller 31 or the like in the form of hardware (for example, as a system on-chip). Alternatively, the controller CTR illustrated in FIG. 4, may be implemented, for example, in the controller 26 or the like in the form of software (for example, as a functional module that is expanded altogether or sequentially into the operation memory 27 or the like by the controller 26 or the like). Alternatively, some functions of the controller CTR illustrated in FIG. 4 may be mounted in the hard disk controller 31 or the like in the form of hardware, and the other functions thereof may be implemented in the controller 26 or the like in the form of software.

The controller CTR includes an A/D conversion module 2, an FIR filtering module 3, a generation module 50, an interference cancelling module 4, an amplitude correcting module 5, a boosting module 60, a correction module 70, a Viterbi equalization module 6, and an ECC decoding module (for example, a low density parity check (LDPC) decoding module 7).

The A/D conversion module 2 acquires a reproduction signal $RS_A$ read from a target track (track A) of the magnetic disk 11 through the reproducing head 22b. The A/D conversion module 2 generates a digital signal $RD_A$ by performing A/D conversion of the reproduction signal $RS_A$ and supplies the digital signal $RD_A$ to the FIR filtering module 3.

The FIR filtering module 3 receives the digital signal $RD_A$ from the A/D conversion module 2. The FIR filtering module 3 equalizes the digital signal $RD_A$ with respect to an arbitrary partial response (PR) target (for example, a PR target such as PR(1, 2, 2, 2, 1)). The FIR filtering module 3 supplies the digital signal S read from the target track (track A) to the generation module 50 and the interference cancelling module 4.

The generation module 50 receives the digital signal S read from the target track (track A) from the FIR filtering module 3. In addition, the generation module 50 reads a digital signal $RD_B$ of the adjacent track (track B) from an adjacent track recording series buffer 51. The generation module 50 acquires a signal $S_B$ written into track B and the noise component $S_B\sim$ by using the read digital signal S and the digital signal $RD_B$ of the adjacent track (track B), respectively. For example, the generation module 50 estimates an interference component by generating an interference component included in the waveform in which the interference occurs by referring to the waveform (signal $S_B$) acquired by converting an existing recording series (digital signal $RD_B$) in which the inter-track interference occurs to a desired PR waveform and the minimum mean square error (MMSE) from the reproduction waveform (signal S) after the FIR equalization in which the interference occurs.

More specifically, the generation module 50 includes an adjacent track recording series buffer 51, a PR target filtering module 52, a clock offset estimating module 53, a clock offset compensating filter generating module 54, a clock offset correcting module 55, an MMSE filter tap generating module 56, and an interference component generating module 57.

The adjacent track recording series buffer 51, for example, temporarily stores data of an adjacent track (track B) that is adjacent to the target track (track A) in the track width direction, in other words, the digital signal $RD_B$ of the adjacent track (track B). The adjacent track recording series buffer 51, for example, may be disposed inside the buffer memory 29 (see FIG. 1), or a memory arranged inside the hard disk controller 31 may be used.

The PR target filtering module 52 reads the digital signal $RD_B$ of the adjacent track (track B) from the adjacent track recording series buffer 51. The PR target filtering module 52 equalizes the digital signal $RD_B$ with respect to an arbitrary partial response (PR) target (a PR target such as PR (1, 2, 2, 2, 1)). The PR target filtering module 52 supplies the equalized digital signal to the clock offset estimating module 53 and the clock offset correcting module 55 as a signal $S_B'$ written into the track B.

The clock offset estimating module 53 receives the signal $S_B'$ written into the adjacent track (track B) from the PR target filtering module 52 and receives the digital signal S read from the target track (track A) from the FIR filtering module 3. The clock offset estimating module 53 estimates a gap between the clock timings of the target track (track A) and the adjacent track (track B) at the time of reading along the circumferential direction of the tracks as a clock offset based on the signals S and $S_B$. The clock offset estimating module 53 supplies the estimated clock offset to the clock offset compensating filter generating module 54.

The clock offset compensating filter generating module 54 receives the estimated clock offset from the clock offset estimating module 53. The clock offset compensating filter generating module 54 generates a correction amount of the clock offset based on the estimated clock offset. The clock offset compensating filter generating module 54 supplies the generated correction amount of the clock offset to the clock offset correcting module 55.

The clock offset correcting module 55 receives the signal $S_B'$ written into track B from the PR target filtering module 52 and receives the correction amount of the clock offset from the clock offset compensating filter generating module 54. The clock offset correcting module 55 corrects for the clock offset of the signal $S_B'$ written into the adjacent track (track B) by using the correction amount of the clock offset. The clock offset correcting module 55 supplies the signal $S_B$ after correction to the MMSE filter tap generating module 56, the interference component generating module 57, the boosting module 60, and the correction module 70 as the signal $S_B$ written into track B.

The MMSE filter tap generating module 56 receives the signal $S_B$ written into the adjacent track (track B) from the clock offset correcting module 55 and receives the digital signal S read from the target track (track A) from the FIR filtering module 3. The MMSE filter tap generating module 56 estimates a noise component $S_B\sim$ based on the signals $S_B$ and S. For example, the MMSE filter tap generating module 56 estimates the noise component $S_B\sim$ by calculating the integral represented in Equation 3 integrated from a frequency of zero to a Nyquist frequency fc (see FIG. 5).

$$d/dt\, E\{(wS - SB)^2\} = 0 \qquad \text{Equation 3}$$

Under a weight w satisfying Equation 3 of "d/d tE{(wS-$S_B$)²}=0", a signal component for which $S_B w = S_B\sim$ is estimated. Here, E{ } represents a statistical average.

The MMSE filter tap generating module 56 supplies the estimated noise component $S_B\sim$ to the interference component generating module 57.

The interference component generating module 57 receives the signal $S_B$ written into the adjacent track (track B) from the clock offset compensating module 55 and receives the noise component $S_B\sim$ from the MMSE filter tap generating module 56. The interference component generating module 57 acquires an interference component applied from the adjacent track (track B) based on the signal $S_B$ written into the adjacent track (track B) and the noise component $S_B\sim$ thereof. For example, the interference component generating module 57, as represented in Equation 4, acquires a difference between the signal $S_B$ written into the adjacent track (track B) and the noise component $S_B\sim$ thereof as the interference component $S_B'$ applied from the adjacent track (track B) and supplies the interference component to the interference cancelling module 4.

$$S_B' = S_B - S_B \qquad \text{Equation 4}$$

In other words, the generation module 50 supplies the interference component $S_B'$ applied from the adjacent track (track B) to the interference cancelling module 4. In addition, the generation module 50 supplies the signal $S_B$ written into track B to the boosting module 60 and the correction module 70 as a standard signal $S_P$.

The interference cancelling module 4 receives the digital signal S read from the target track (track A) from the FIR filtering module 3 and receives the interference component $S_B'$ applied from the adjacent track (track B) from the generation module 50. The interference cancelling module 4 cancels the interference component $S_B'$ applied from the adjacent track (track B) from the digital signal S read from the target track (track A), thereby generating a first correction signal. For example, the interference cancelling module 4, as illustrated in Equation 2 represented above, cancels the interference component $S_B'$ from the signal S by subtracting the interference component $S_B'$ from the signal S and sets the signal S' ($=S_A - S_A\sim$) after cancellation as a first correction signal. The interference canceling module 4 supplies the first correction signal S' to the amplitude correcting module 5 and the correction module 70.

The amplitude correcting module 5 receives the first correction signal S' from the interference cancelling module 4. The amplitude correcting module 5 boosts each frequency component of the first correction signal S' as a whole. For example, the amplitude correcting module 5 boosts the first correction signal S' as a whole at a first boosting ratio α that corresponds to the ratio of the interference component $S_B'$ applied from the adjacent track (track B) to the digital signal S read from the target track (track A).

For example, the correction module 70, to be described later, as a first comparison result, for example, acquires an amplitude ratio $\sqrt{\{PW(S_P)\}/\{PW(S')\}}$ of the power PW($S_P$) of the standard signal $S_P$ to the power PW(S') of the first correction signal S' in which the interference component has been cancelled and supplies the acquired amplitude ratio to the amplitude correcting module 5. The amplitude correcting module 5 receives the first comparison result (for example, the amplitude ratio $\sqrt{\{PW(S_P)\}/\{PW(S')\}}$) from the correction module 70, determines a first boosting ratio α based on the first comparison result (for example, the amplitude ratio $\sqrt{\{PW(S_P)\}/\{PW(S')\}}$), and boosts the first correction signal S' at the determined first boosting ratio α as a whole.

In other words, the amplitude correcting module 5 normalizes the amplitude such that an average amplitude value of the reproduction waveform of which the signal intensity has decreased due to the cancellation of the interference is an average amplitude value of the desired PR waveform. The amplitude correcting module 5 supplies the signal BS that has been boosted as a whole to the boosting module 60 as a signal corresponding to the first correction signal S'.

The boosting module 60 receives a signal BS according to the first correction signal S', in other words, the signal BS that has been boosted as a whole from the amplitude correcting module 5. The boosting module 60 receives the standard signal $S_P$ from the generation module 50. The boosting module 60 selectively boosts the low frequency component of the signal BS that has been boosted as a whole in accordance with the standard signal $S_P$, thereby generating a second correction signal. In other words, the boosting module 60 selectively boosts the low frequency component of the signal BS at a second boosting ratio β corresponding to the low frequency component of the standard signal $S_P$ to the low frequency component of the signal BS. In other words, the boosting module 60 estimates the amount of attenuation of the low frequency component of the reproduction waveform in which the interference occurs by forming the desired PR target waveform (signal $S_P$) and the waveform (signal BS) after the FIR equalization and the cancellation of the interference as signal having only a low frequency component by passing them through a low pass filter (LPF) with a cutoff value and comparing the signal power levels thereof with each other and performs correction for boosting the amount of attenuation.

More specifically, the boosting module 60 includes a low pass filter controller 61, low pass filter modules 62 and 63, signal power calculating modules 64 and 65, a signal power comparing module 66, a low frequency correction filter controller 67, a low frequency correction filter generating module 68, and a frequency characteristic correcting module 69.

The low pass filter controller 61 controls the operations of the low pass filter modules 62 and 63, respectively. For example, the low pass filter controller 61 controls the low pass filter modules 62 and 63 such that the cutoff frequencies fco (see FIG. 5) of the low pass filter modules 62 and 63 are equivalent to each other.

The low pass filter module 62 receives the signal BS that has been boosted as a whole from the amplitude correcting module 5. The low pass filter module 62 extracts a low frequency component FC(BS) from the signal BS. For example, the low pass filter module 62 extracts a frequency component (for example, a portion of a curve represented by a solid line in FIG. 5 that is surrounded by dashed lines) of the signal BS of which the frequency is the cutoff frequency fco or lower as a low frequency component FC(BS). The low pass filter module 62 supplies the extracted low frequency component FC(BS) to the signal power calculating module 64.

The low pass filter module 63 receives the standard signal $S_P$ from the generation module 50. The low pass filter module 63 extracts a low frequency component $FC(S_P)$ from the signal $S_P$. For example, the low pass filter module 63 extracts a frequency component (for example, a portion of a curve represented by a broken line in FIG. 5 that is surrounded by dashed lines) of the signal $S_P$ of which the frequency is the cutoff frequency fco or lower as a low frequency component $FC(S_P)$. The low pass filter module 63 supplies the extracted low frequency component $FC(S_P)$ to the signal power calculating module 65.

The signal power calculating module 64 receives the low frequency component FC(BS) from the low pass filter module 62. The signal power calculating module 64 calculates the power PW(FC(BS)) of the low frequency component FC(BS). For example, the signal power calculating module 64, as represented in Equation 5, averages an integral value of the power value of the low frequency component FC(BS) integrated from a frequency of zero to the cutoff frequency fco over the frequency width fco, thereby calculating the power PW(FC(BS)) of the low frequency component FC(BS).

$$PW(FC(BS)) = \int FC(BS) df/(fco) \qquad \text{Equation 5}$$

The signal power calculating module 64 supplies the calculated power PW(FC(BS)) to the signal power comparing module 66.

The signal power calculating module 65 receives the low frequency component $FC(S_P)$ from the low pass filter module 63. The signal power calculating module 65 calculates the power $PW(FC(S_P))$ of the low frequency component $FC(S_P)$. For example, the signal power calculating module 65, as represented in Equation 6, averages an integral value of the power value of the low frequency component $FC(S_P)$ integrated from a frequency of zero to the cutoff frequency fco over the frequency width fco, thereby calculating the power $PW(FC(S_P))$ of the low frequency component $FC(S_P)$.

$$PW(FC(S_P)) = \int FC(S_P) df/(fco) \qquad \text{Equation 6}$$

The signal power calculating module 65 supplies the calculated power $PW(FC(S_P))$ to the signal power comparing module 66.

The signal power comparing module 66 receives the power PW(FC(BS)) of the low frequency component FC(BS) from the signal power calculating module 64 and receives the power $PW(FC(S_P))$ of the low frequency component $FC(S_P)$ from the signal power calculating module 65. The signal power comparing module 66 compares the power PW(FC(BS)) and the power $PW(FC(S_P))$ with each other and generates a second comparison result. For example, the signal power comparing module 66 generates an amplitude ratio $\sqrt{\{PW(FC(S_P))\}/\{PW(FC(BS))\}}$ of the power $PW(FC(S_P))$ to the power PW(FC(BS)) as a second comparison result. The signal power comparing module 66 supplies the generated second comparison result (for example, the amplitude ratio $\sqrt{\{PW(FC(S_P))\}/\{PW(FC(BS))\}}$) to the low frequency correction filter controller 67, the low frequency correction filter generating module 68, and the correction module 70.

The low frequency correction filter controller 67 receives the second comparison result (for example, the amplitude ratio $\sqrt{\{PW(FC(S_P))\}/\{PW(FC(BS))\}}$) from the signal power comparing module 66. The low frequency correction filter controller 67 controls the operation of the low frequency correction filter generating module 68 based on the second comparison result. For example, the low frequency correction filter controller 67 determines a second boosting ratio β based on the amplitude ratio $\sqrt{\{PW(FC(S_Q))\}/\{PW(FC(BS))\}}$. Then, the low frequency correction filter controller 67 performs control of the low frequency correction filter generating module 68 such that the boosting ratio of the low frequency correction filter generated by the low frequency correction filter generating module 68 is the second boosting ratio β.

The low frequency correction filter generating module 68 receives information of the cutoff frequency fco from the low pass filter controller 61 through the low frequency correction filter controller 67 and receives the second boosting ratio β from the low frequency correction filter controller 67. The low frequency correction filter generating module 68 generates a low frequency correction filter used for selectively boosting the low frequency component based on the cutoff frequency fco and the second boosting ratio β. For example, the low frequency correction filter generating module 68 generates a low frequency correction filter that selectively boosts a frequency component from a frequency of zero to the cutoff frequency fco as a low frequency component at the second boosting ratio β. The low frequency correction filter generating module 68 supplies information of the generated low frequency correction filter to the frequency characteristic correcting module 69.

The frequency characteristic correcting module 69 receives the signal corresponding to the first correction signal S', in other words, the signal BS that has been boosted as a whole from the amplitude correcting module 5.

In addition, the frequency characteristic correcting module 69 receives the information of the low frequency correction filter from the low frequency correction filter generating module 68. The frequency characteristic correcting module 69 selectively boosts the low frequency component of the signal BS that has been boosted as a whole by the amplitude correcting module 5 at the second boosting ratio β by using the information of the low frequency correction filter. For example, the frequency characteristic correcting module 69, as denoted by a white arrow in FIG. 5, selectively boosts a frequency component of the signal BS from a frequency of zero to the cutoff frequency fco as a low frequency component. The frequency characteristic correcting module 69 supplies the signal BS' of which the low frequency component has been selectively boosted to the Viterbi equalization module 6.

In other words, the boosting module 60 supplies the signal BS' of which the low frequency component has been selectively boosted to the Viterbi equalization module 6 as a second correction signal. In addition, the boosting module 60 may write the signal BS' into the adjacent track recording series buffer 51 so as to prepare the reproduction process of the next track.

The Viterbi equalization module 6 receives the signal BS' of which the low frequency component has been selectively boosted from the boosting module 60. The Viterbi equalization module 6 performs a Viterbi equalization process for the signal BS'. In other words, Viterbi equalization module 6 performs sampling of the signal BS' at a predetermined time interval and acquires a likelihood value of a signal bit value being zero and a likelihood value of the signal bit value being one for each sampled point.

Figure 6:
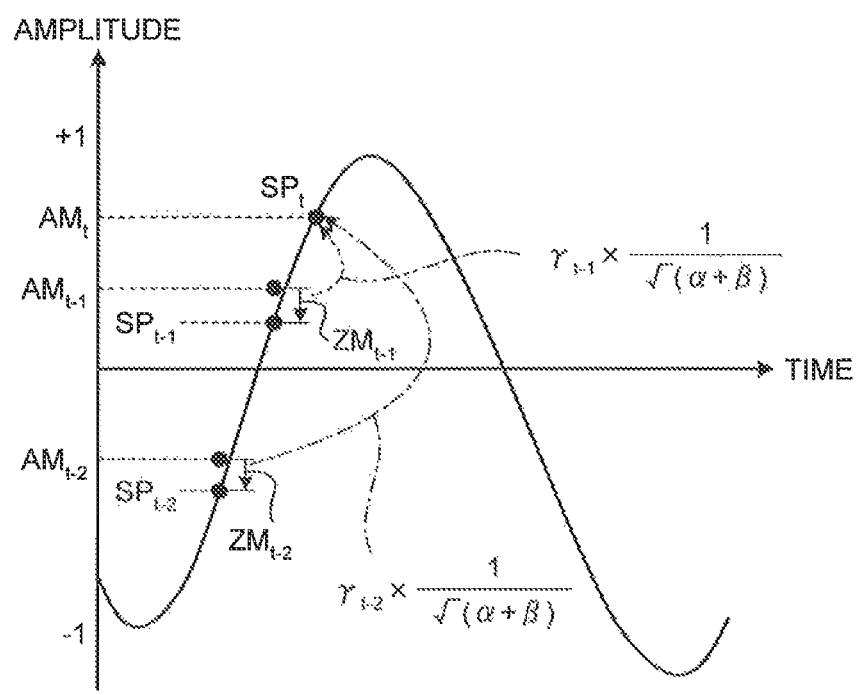
FIG. 6 is a diagram that illustrates the operation of the controller according to the first embodiment.

Here, suppose a case in which the correction module 70 is not arranged. In such a case, the Viterbi equalization module 6 calculates a likelihood value of the second correction value BS' by using a noise variance value representing a variation in the noise. For example, when the amplitude of a sampled point SPt of the second correction signal BS' at the current time t is $AM_t$ in a case where the amplitude of the second correction signal BS' is normalized to from −1 to +1 (see FIG. 6), and a noise variance value of noise included in the second correction signal BS' is $\sigma^2$, a likelihood value Pt(0) of a bit value of the sampled point SPt being "0" and a likelihood value Pt(1) of a bit value being 1 are as represented in Equations 7 and 8, respectively.

$$Pt(0)=(-1-AM_t)^2/\sigma^2 \qquad \text{Equation 7}$$

$$Pt(1)=(1-AM_t)^2/\sigma^2 \qquad \text{Equation 8}$$

In addition, in order to increase the calculation accuracy of the likelihood value, the Viterbi equalization module 6 calculates a likelihood value of a signal corresponding to the second correction signal by using an auto regressive (AR) model, in other words, correlation coefficients representing correlation characteristics of signals with respect to the time. For example, when the correlation coefficients of noises before 1, 2, . . . , N samples from the current time t in the second correction signal BS' are $\gamma_{t-1}, \gamma_{t-2}, \ldots, \gamma_{t-N}$, and the amplitudes of noises at sampled points $SP_{t-1}, SP_{t-2}, \ldots, SP_{t-N}$ before 1, 2, . . . , N samples from the current time t are $ZM_{t-1}, ZM_{t-2}, \ldots, ZM_{t-N}$, Equations 7 and 8 are reformed to the following Equations 9 and 10 (see FIG. 6).

$$Pt(0)=(-1-AM_t)^2/\sigma^2-\gamma_{t-1}(-1-ZM_{t-1})^2/\sigma^2-\gamma_{t-2}(-1-ZM_{t-2})^2/\sigma^2 \ldots -\gamma_{t-N}(-1-ZM_{t-N})^2/\sigma^2 \qquad \text{Equation 9}$$

$$Pt(1)=(1-AM_t)^2/\sigma^2-\gamma_{t-1}(1-ZM_{t-1})^2/\sigma^2-\gamma_{t-2}(1-ZM_{t-2})^2/\sigma^2 \ldots -\gamma_{t-N}(1-ZM_{t-N})^2/\sigma^2 \qquad \text{Equation 10}$$

By performing calculations of Equations 9 and 10, the Viterbi equalization module 6 can calculate a likelihood value with the effect of the past sampled points on the sampled point SPt at the current time t being taken into account, whereby the likelihood value Pt(0) of the bit value of the sampled point SPt being "0" and the likelihood value Pt(1) of the bit value being "1" can be calculated with high accuracy.

However, according to the review of the inventors, although the original user data can be restored by the Viterbi equalization process performed by the Viterbi equalization module 6, it has been found that the calculation accuracy of the likelihood may be easily lowered, and it tends to be difficult that the bit value of the restored data is an appropriate value. The reason for those has been further reviewed by the inventors. As a result, it has been found that the reason is that, in a case where the low frequency component of the signal of which the interference component has been cancelled is selectively boosted, a low frequency component such as a noise component NC2 denoted by a dashed line in FIG. 5 is selectively boosted with respect to a noise component NC1 denoted by a double dashed line in FIG. 5.

More specifically, in a case where the low frequency component is selectively boosted, a variation in the noise component tends to increase, and it is understood that the noise variance $\sigma^2$ represented in Equations 7 to 10 tends to increase.

In addition, in a case where the low frequency component of the noise component is selectively boosted, the level of the low frequency component in the amplitude of the current sampled point changes, and it is understood that the correlation (correlation coefficient) of the past sampled points with respect to the time tends to decrease.

Thus, in this embodiment, the correction module 70 is arranged in the disk drive 1, and the correction module 70 performs correction such that the noise variance value increases in accordance with the boosting ratio, and the correlation coefficient decreases in accordance with the boosting ratio, whereby the calculation accuracy of the likelihood value is further improved.

In other words, the correction module 70 corrects the noise variance value to be used by the Viterbi equalization module 6 and the correlation coefficient to be used by the Viterbi equalization module 6 in accordance with the first boosting ratio $\alpha$ and the second boosting ratio $\beta$. For example, the correction module 70 performs weighting by multiplying the noise variance value by a value according to the first boosting ratio $\alpha$ and the second boosting ratio $\beta$, thereby correcting the noise variance value. In addition, for example, the correction module 70 performs weighting by multiplying each correlation coefficient by the reciprocal of a value according to the first boosting ratio $\alpha$ and the second boosting ratio $\beta$, thereby correcting each correlation coefficient.

More specifically, the correction module 70 includes signal power calculating modules 71 and 72, a signal power comparing module 73, a correction value controller 74, a noise variance correcting module 75, and a correlation coefficient correcting module 76.

The signal power calculating module 71 receives the standard signal $S_P$ from the generation module 50. The signal power calculating module 71 calculates the power $PW(S_P)$ of the signal $S_P$. For example, the signal power calculating module 71, as represented in Equation 11, calculates the power $PW(S_P)$ of the signal $S_P$ by averaging an integral value acquired by integrating the power value of the signal $S_P$ from a frequency of "0" to the Nyquist frequency fc (see FIG. 5) over the frequency width (fc).

$$PW(S_P)=\int S_P df/(fc) \qquad \text{Equation 11}$$

The signal power calculating module 71 supplies the calculated power $PW(S_P)$ to the signal power comparing module 73.

The signal power calculating module 72 receives the first correction signal S' from the interference cancelling module 4. The signal power calculating module 72 calculates the power $PW(S')$ of the first correction signal S'. For example, the signal power calculating module 72, as represented in Equation 12, calculates the power $PW(S')$ of the first correction signal S' by averaging an integral value acquired by integrating the power value of the first correction signal S' from a frequency of "0" to the Nyquist frequency fc (see FIG. 5) over the frequency width (fc).

$$PW(S')=\int S' df/(fc) \qquad \text{Equation 12}$$

The signal power calculating module 72 supplies the calculated power $PW(S')$ to the signal power comparing module 73.

The signal power comparing module 73 receives the power $PW(S_P)$ of the signal $S_P$ from the signal power calculating module 71 and receives the power $PW(S')$ of the first correction signal S' from the signal power calculating module 72. The signal power comparing module 73 compares the power $PW(S_P)$ and the power $PW(S')$ with each other and generates a first comparison result. For example, the signal power comparing module 73 generates an amplitude ratio $\sqrt{\{PW(S_P)\}}/\sqrt{\{PW(S')\}}$ of the power $PW(S_P)$ to the power $PW(S')$ as a first comparison result. The signal power comparing module 73 supplies the generated first comparison result (for example, the amplitude ratio $\sqrt{\{PW(S_P)\}}/\sqrt{\{PW(S')\}}$) to the correction value controller 74, the noise variance correcting module 75, the correlation coefficient correcting module 76, and the amplitude correcting module 5.

The correction value controller 74 receives the first comparison result (for example, the amplitude ratio $\sqrt{\{PW(S_P)\}}/\sqrt{\{PW(S')\}}$) from the signal power comparing module 73. The correction value controller 74 controls the operations of the noise variance correcting module 75 and the correlation coefficient correcting module 76 based on the first comparison result. For example, the correction value controller 74 controls the operations of the noise variance correcting module 75 and the correlation coefficient correcting module 76 such that a first boosting ratio $\alpha$ is determined by the amplitude correcting module 5 based on the amplitude ratio $\sqrt{\{PW(S_P)\}}/\sqrt{\{PW(S')\}}$ and a second boosting ratio $\beta$ is determined by the boosting module 60.

The noise variance correcting module 75 receives the first comparison result (for example, the amplitude ratio $\sqrt{\{PW(S_P)\}}/\sqrt{\{PW(S')\}}$) from the signal power comparing module 73 and receives the second comparison result (for example, the amplitude ratio $\sqrt{\{PW(FC(S_P))\}}/\sqrt{\{PW(FC(BS))\}}$) from the signal power comparing module 66. The noise variance correcting module 75 determines a first boosting ratio $\alpha$ in accordance with the first comparison result (for example, the amplitude ratio $\sqrt{\{PW(S)\}}/\sqrt{\{PW(S')\}}$) and determines a second boosting ratio $\beta$ in accordance with the second comparison result (for example, the amplitude ratio $\sqrt{\{PW(FC(S_P))\}}/\sqrt{\{PW(FC(BS))\}}$).

The noise variance correcting module 75 corrects the noise variance value to be used by the Viterbi equalization module 6 in accordance with the first boosting ratio $\alpha$ and the second boosting ratio $\beta$. For example, the noise variance correcting module 75 corrects the noise variance value such that the noise variance value increases in accordance with the first boosting ratio $\alpha$ and the second boosting ratio $\beta$. For example, the noise variance correcting module 75 performs weighting of the noise variance value by multiplying the noise variance value by a value according to the first boosting ratio $\alpha$ and the second boosting ratio $\beta$.

For example, when the noise variance value of a noise included in the second correction signal BS' is $\sigma^2$, the noise variance correcting module 75 corrects the noise variance value $\sigma^2$ to a weighted noise variance value $\sigma^2 \times (\alpha+\beta)$. Alternatively, the noise variance correcting module 75 corrects the noise variance value $\sigma^2$ to a weighted noise variance value $\sigma^2 \times \sqrt{(\alpha+\beta)}$. Alternatively, the noise variance correcting module 75 corrects the noise variance value $\sigma^2$ to a weighted noise variance value $\sigma^2 \times \{\sqrt{(\alpha)}+\sqrt{(\beta)}\}$.

The correlation coefficient correcting module 76 receives the first comparison result (for example, the amplitude ratio $\sqrt{\{PW(S_P)\}}/\sqrt{\{PW(S')\}}$) from the signal power comparing module 73 and receives the second comparison result (for example, the amplitude ratio $\sqrt{\{PW(FC(S_P))\}}/\sqrt{\{PW(FC(BS))\}}$) from the signal power comparing module 66. The correlation coefficient correcting module 76 determines a first boosting ratio $\alpha$ in accordance with the first comparison result (for example, the amplitude ratio $\sqrt{\{PW(S_P)\}}/\sqrt{\{PW(S')\}}$) and determines a second boosting ratio $\beta$ in accordance with the second comparison result (for example, the amplitude ratio $\sqrt{\{PW(FC(S_P))\}}/\sqrt{\{(PW(FC(BS))\}}$).

The correlation coefficient correcting module 76 corrects the correlation coefficient to be used by the Viterbi equalization module 6 in accordance with the first boosting ratio $\alpha$ and the second boosting ratio $\beta$. For example, the correlation coefficient correcting module 76 corrects the noise variance value such that the correlation coefficient decreases in accordance with the first boosting ratio $\alpha$ and the second boosting ratio $\beta$. For example, the correlation coefficient correcting module 76 performs weighting of the correlation coefficient by multiplying the correlation coefficient by the reciprocal of a value according to the first boosting ratio $\alpha$ and the second boosting ratio $\beta$.

For example, when the correlation coefficients before 1, 2, ..., N samples from the current time t in the second correction signal BS' are $\gamma_{t-1}, \gamma_{t-2}, \ldots, \gamma_{t-1}$, the correlation coefficient correcting module 76 corrects the correlation coefficients $\gamma_{t-1}, \gamma_{t-2}, \ldots, \gamma_{t-N}$ to weighted correlation coefficients $\gamma_{t-1} \times 1/(\alpha+\beta), \gamma_{t-2} \times 1/(\alpha+\beta), \ldots, \gamma_{t-N} \times 1/(\alpha+\beta)$. Alternatively, for example, the correlation coefficient correcting module 76 corrects the correlation coefficients $\gamma_{t-1}, \gamma_{t-2}, \ldots, \gamma_{t-N}$ to weighted correlation coefficients $\gamma_{t-1} \times 1/\sqrt{(\alpha+\beta)}, \gamma_{t-2} \times 1/\sqrt{(\alpha+\beta)}, \ldots, \gamma_{t-N} \times 1/\sqrt{(\alpha+\beta)}$ (see FIG. 6). Alternatively, for example, the correlation coefficient correcting module 76 corrects the correlation coefficients $\gamma_{t-1}, \gamma_{t-2}, \ldots, \gamma_{t-N}$ to weighted correlation coefficients $\gamma_{t-1} \times 1/\{\sqrt{(\alpha)}+\sqrt{(\beta)}\}, \gamma_{t-2} \times 1/\{\sqrt{(\alpha)}+\sqrt{(\beta)}\}, \ldots, \gamma_{t-N} \times 1/\{\sqrt{(\alpha)}+\sqrt{(\beta)}\}$.

Accordingly, the Viterbi equalization module 6 receives the corrected noise variance value from the noise variance correcting module 75 and receives the corrected correlation coefficient from the correlation coefficient correcting module 76. The Viterbi equalization module 6 performs the Viterbi equalization process for the signal BS' by using the corrected noise variance value or by using the corrected noise variance value and the corrected correlation coefficient. In other words, the Viterbi equalization module 6 performs sampling of the signal BS' at a predetermined time interval and acquires a likelihood value of a signal bit value being 0 and a likelihood value of the bit value being 1 for each sampled point.

For example, in a case where the noise variance correcting module 75 corrects the noise variance value $\sigma^2$ to a weighted noise variance value $\sigma^2 \times (\alpha+\beta)$, the Viterbi equalization module 6 acquires a likelihood value of the signal bit value being 0 and a likelihood value of the bit value being 1 for each sampled point by using the following Equations 13 and 14 instead of Equations 7 and 8.

$$Pt(0)=(-1-AM_t)^2/\{\sigma^2 \times (\alpha+\beta)\} \quad \text{Equation 13}$$

$$Pt(1)=(1-AM_t)^2/\{\sigma^2 \times (\alpha+\beta)\} \quad \text{Equation 14}$$

Alternatively, for example, in a case where the noise variance correcting module 75 corrects the noise variance value $\sigma^2$ to the weighted noise variance value $\sigma^2 \times (\alpha+\beta)$, and the correlation coefficient correcting module 76 corrects the correlation coefficients $\gamma_{t-1}, \gamma_{t-2}, \ldots, \gamma_{t-N}$ to weighted correlation coefficients $\gamma_{t-1} \times 1/\sqrt{(\alpha+\beta)}, \gamma_{t-2} \times 1/\sqrt{(\alpha+\beta)}, \ldots, \gamma_{t-N} \times 1/\sqrt{(\alpha+\beta)}$, the Viterbi equalization module 6 acquires a likelihood value of the signal bit value being 0 and a likelihood value of the bit value being 1 for each sampled point by using the following Equations 15 and 16 instead of Equations 9 and 10.

$$Pt(0)=(-1-AM_t)^2/\{\sigma^2 \times (\alpha+\beta)\}-\gamma_{t-1} \times 1/\sqrt{(\alpha+\beta)} \times (-1-AM_{t-1})^2/\{\sigma^2 \times (\alpha+\beta)\}-\gamma_{t-2} \times 1/\sqrt{(\alpha+\beta)} \times (-1-AM_{t-2})^2/\{\sigma^2 \times (\alpha+\beta)\} \ldots -\gamma_{t-N} \times 1/\sqrt{(\alpha+\beta)} \times (-1-AM_{t-N})^2/\{\sigma^2 \times (\alpha+\beta)\} \quad \text{Equation 15}$$

$$Pt(1)=(1-AM_t)^2/\{\sigma^2 \times (\alpha+\beta)\}-\gamma_{t-1} \times 1/\sqrt{(\alpha+\beta)} \times (1-AM_{t-1})^2/\{\sigma^2 \times (\alpha+\beta)\}-\gamma_{t-2} \times 1/\sqrt{(\alpha+\beta)} \times (1-AM_{t-2})^2/\{\sigma^2 \times (\alpha+\beta)\} \ldots -\gamma_{t-N} \times 1/\sqrt{(\alpha+\beta)} \times (1-AM_{t-N})^2/\{\sigma^2 \times (\alpha+\beta)\} \quad \text{Equation 16}$$

Then, the Viterbi equalization module 6 compares the likelihood value of the bit value being 0 and the likelihood value of the bit value being 1 with each other. For example, by selecting a bit value having a higher likelihood value for each sampled point, the Viterbi equalization module 6 estimates a signal bit value for each sampled point, thereby acquiring reproduction data. In other words, the Viterbi equalization module 6 equalizes the level of the signal of each sampled point to a bit value of 0 or a bit value of 1 for the signal BS', thereby generating reproduction data. The Viterbi equalization module 6 supplies the generated reproduction data to the LDPC decoding module 7.

The LDPC decoding module 7 receives the reproduction data from the Viterbi equalization module 6. The LDPC decoding module 7 recognizes a data part and an LDPC code in the reproduction data respectively and performs an LDPC decoding process for the LDPC code, thereby decoding the LDPC code. Regarding the LDPC code, in order to perform error correction, the LDPC code is encoded in advance at the time of writing data and is included in the write data. The LDPC decoding module 7 performs an error correction process for the data part using the decoded LDPC code. In other words, the LDPC decoding module 7 performs error correction of each bit value in the data part and restores user data UD. In the controller CTR, although a case is illustrated as an example in which error correction according to the LDPC system is performed at the time of writing data and at the time of reading data, an error correction system other than the LDPC system may be used.

Figure 7:
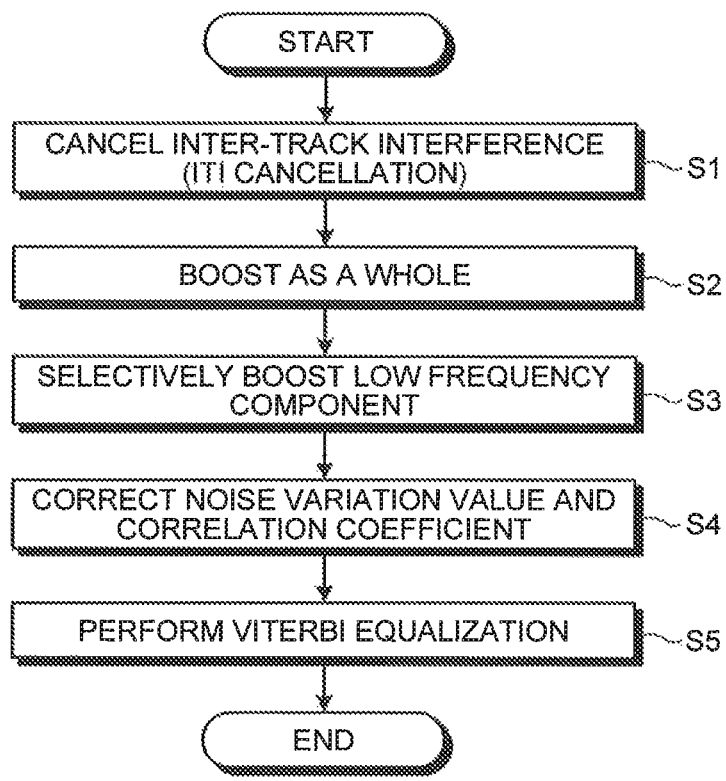
FIG. 7 is a flowchart that illustrates the operation of the disk drive according to the first embodiment.

Next, the operation of the disk drive 1 will be described with reference to FIG. 7. FIG. 7 is a flowchart that illustrates the operation of the disk drive 1.

In Step S1, the disk drive 1 cancels an inter-track interference component (ITI cancellation).

For example, the disk drive 1 reads a reproduction signal RSA from a target track (track A) of the magnetic disk 11 through the reproducing head 22b and performs A/D conversion of the reproduction signal $RS_A$, thereby generating a digital signal $RD_A$. The disk drive 1 equalizes the digital signal $RD_A$ with respect to an arbitrary partial response (PR) target (for example, a PR target such as PR(1, 2, 2, 2, 1)) and acquires an equalized digital signal S, in other words, a digital signal S read from the target track (track A).

For example, the disk drive 1 reads a digital signal $RD_B$ of an adjacent track (track B) that is stored in the adjacent track recording series buffer 51, equalizes the digital signal $RD_B$ with respect to an arbitrary partial response (PR) target (for example, a PR target such as PR(1, 2, 2, 2, 1)), and corrects for the clock offset, thereby acquiring a signal $S_B$ written into the adjacent track (track B).

Then, the disk drive 1 cancels an interference component $S_B'$ applied from the adjacent track (track B) in the digital signal S read from the target track (track A), thereby generating a first correction signal S' ($=S_A-S_A\sim$).

In Step S2, the disk drive 1 boosts each frequency component of a signal corresponding to the first correction signal S' as a whole. For example, the disk drive 1 boosts the first correction signal S' as a whole at a first boosting ratio $\alpha$ that corresponds to the ratio of the interference component $S_B'$ applied from the adjacent track (track B) to the digital signal S read from the target track (track A).

For example, the disk drive 1 acquires an amplitude ratio $\sqrt{\{PW(S_P)\}}/\sqrt{\{PW(S')\}}$ of the power $PW(S_P)$ of the standard signal $S_P$ to the power PW(S') of the first correction signal S' in which the interference component has been cancelled. The disk drive 1 determines a first boosting ratio $\alpha$ based on the acquired amplitude ratio $\sqrt{\{PW(S_P)\}}/\sqrt{\{PW(S')\}}$ and boosts the first correction signal S' at the determined first boosting ratio $\alpha$ as a whole.

In Step S3, the disk drive 1 selectively boosts the low frequency component of a signal corresponding to the first correction signal S', in other words, the signal BS that has been boosted as a whole. For example, the disk drive 1 selectively boosts the low frequency component of the signal BS at a second boosting ratio $\beta$ corresponding to the ratio of the low frequency component of the signal BS to the low frequency component of the standard signal $S_P$.

For example, the disk drive 1 acquires an amplitude ratio $\sqrt{\{PW(FC(S_P))\}}/\sqrt{\{PW(FC(BS))\}}$ of the power $PW(FC(S_P))$ of the low frequency component $FC(S_P)$ of the standard signal $S_P$ to the power PW(FC(BS)) of the low frequency component FC(BS) of the signal BS. The disk drive 1 determines a second boosting ratio $\beta$ based on the acquired amplitude ratio $\sqrt{\{PW(FC(S_P))\}}/\sqrt{\{PW(FC(BS))\}}$ and selectively boosts the low frequency component of the signal BS at the determined second boosting ratio $\beta$.

In Step S4, the disk drive 1 corrects the noise variance value to be used in the Viterbi equalization process in accordance with the first boosting ratio $\alpha$ and the second boosting ratio $\beta$ and corrects the correlation coefficient to be used in the Viterbi equalization process. For example, the disk drive 1 corrects the noise variance value such that the noise variance value increases in accordance with the first boosting ratio $\alpha$ and the second boosting ratio $\beta$. In addition, the disk drive 1 corrects the correlation coefficient such that the correlation coefficient decreases in accordance with the first boosting ratio $\alpha$ and the second boosting ratio $\beta$.

For example, the disk drive 1 performs weighting of the noise variance value by multiplying the noise variance value by a value according to the first boosting ratio $\alpha$ and the second boosting ratio $\beta$. In addition, for example, the disk drive 1 performs weighting of the correlation coefficient by multiplying the correlation coefficient by the reciprocal of a value according to the first boosting ratio $\alpha$ and the second boosting ratio $\beta$.

In Step S5, the disk drive 1 performs the Viterbi equalization process. For example, the disk drive 1 performs the Viterbi equalization process for the signal BS' by using the corrected noise variance value or the corrected noise variance value and the corrected correlation coefficient. From this, the disk drive 1 acquires the reproduction data. The disk drive 1 performs an error correction process for the reproduction data, thereby restoring the user data.

As above, according to the first embodiment, in the disk drive 1, the interference cancelling module 4 cancels an interference component applied from the adjacent track in the signal read from the target track, thereby generating a first correction signal. The boosting module 60 selectively boosts the low frequency component of a signal corresponding to the first correction signal, thereby generating a second correction signal. From this, the low frequency component that has attenuated in accordance with the cancellation of the inter-track interference component (ITI cancellation) can be selectively restored. As a result, in a case where the inter-track interference component is cancelled (ITI cancellation), the data written into the track can be accurately read.

Accordingly, since the resistance against the inter-track interference can be improved, the track pitch can be easily narrowed. Alternatively, the margin for the position determining precision of the recording and reproducing head can be set to be relatively large, and accordingly, the storage capacity of the disk medium can be improved.

In addition, according to the first embodiment, in the disk drive 1, the noise variance correcting module 75 corrects the noise variance value to be used by the Viterbi equalization module 6. The Viterbi equalization module 6 calculates a likelihood value of a signal corresponding to the second correction signal using the corrected noise variance value and equalizes the signal corresponding to the second correction signal based on the calculated likelihood value. From this, the influence of the selectively boosting of the low frequency component of the signal corresponding to the first correction signal can be relieved, and accordingly, the calculation accuracy of the likelihood value performed in the Viterbi equalization module 6 can be improved.

Furthermore, according to the first embodiment, in the disk drive 1, the correlation coefficient correcting module 76 corrects the correlation coefficient to be used by the Viterbi equalization module 6. The Viterbi equalization module 6 calculates a likelihood value of a signal corresponding to the second correction signal using the corrected correlation coefficient and equalizes the signal corresponding to the second correction signal based on the calculated likelihood value. From this, the influence of the selectively boosting of the low frequency component of the signal corresponding to the first correction signal can be relieved, and accordingly, the calculation accuracy of the likelihood value performed in the Viterbi equalization module 6 can be improved.

In addition, according to the first embodiment, in the disk drive 1, the amplitude correcting module 5 boosts the first correction signal at the first boosting ratio $\alpha$ as a whole and supplies the signal that has been boosted as a whole to the boosting module 60 as a signal corresponding to the first correction signal. The boosting module 60 selectively boosts, at the second boosting ratio $\beta$, the low frequency component of the signal that has been boosted as a whole by the amplitude correcting module 5. The noise variance correcting module 75 corrects the noise variance value to be used by the Viterbi equalization module 6 in accordance with the first boosting ratio $\alpha$ and the second boosting ratio $\beta$. From this, the noise variance value can be corrected so as to increase in accordance with the first boosting ratio $\alpha$ and the second boosting ratio $\beta$, and accordingly, the correction can be performed such that the influence of the selectively boosting of the low frequency component of the signal corresponding to the first correction signal is relieved.

Furthermore, according to the first embodiment, in the disk drive 1, the amplitude correcting module 5 boosts the first correction signal at the first boosting ratio $\alpha$ as a whole and supplies the signal that has been boosted as a whole to the boosting module 60 as a signal corresponding to the first correction signal. The boosting module 60 selectively boosts, at the second boosting ratio $\beta$, the low frequency component of the signal that has been boosted as a whole by the amplitude correcting module 5. The correlation coefficient correcting module 76 corrects the correlation coefficient to be used by the Viterbi equalization module 6 in accordance with the first boosting ratio $\alpha$ and the second boosting ratio $\beta$. From this, the correlation coefficient can be corrected so as to be decreased in accordance with the first boosting ratio $\alpha$ and the second boosting ratio $\beta$, and accordingly, the correction can be performed such that the influence of the selectively boosting of the low frequency component of the signal corresponding to the first correction signal is relieved.

Second Embodiment

Next, a disk drive 1i according to a second embodiment will be described. Hereinafter, each part different from that of the first embodiment will be focused in the description. Description of the configuration that is similar to that of the first embodiment will not be presented or will be simplified.

While, in the first embodiment, after the signal in which the interference component is cancelled is boosted as a whole, the low frequency component is selectively boosted, in the second embodiment, after the low frequency component of the signal in which the interference component is cancelled is selectively boosted, then the signal is boosted as a whole.

Figure 8:
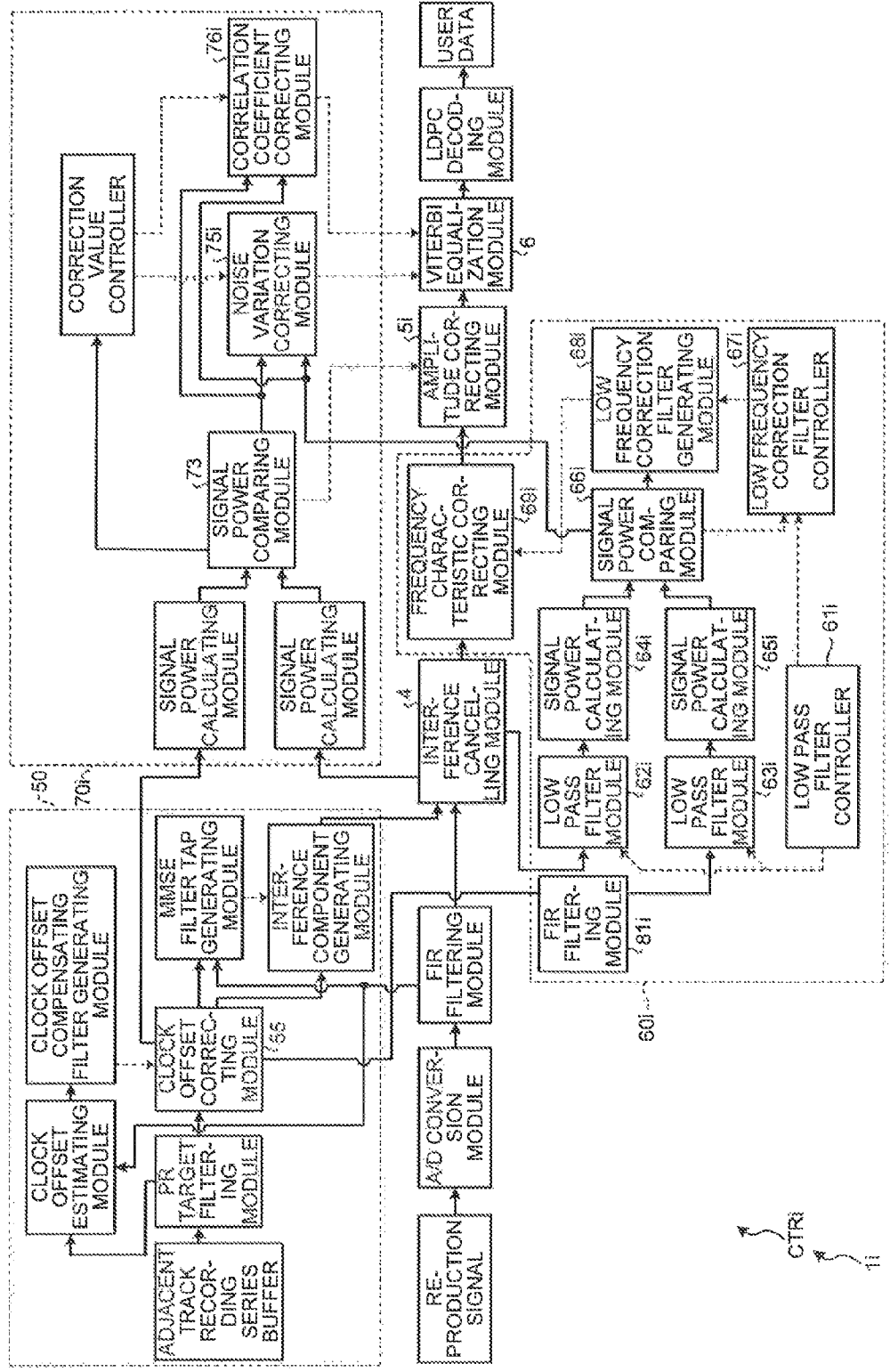
FIG. 8 is a diagram that illustrates the configuration of a controller according to a second embodiment.

More specifically, as illustrated in FIG. 8, in the disk drive 1i, a controller CTRi includes a boosting module 60i instead of the boosting module 60 (see FIG. 4), includes an amplitude correcting module 5i instead of the amplitude correcting module 5 (see FIG. 4), and includes a correction module 70i instead of the correction module 70 (see FIG. 4).

The boosting module 60i receives a first correction signal S' from the interference cancelling module 4 as a signal corresponding to the first correction signal S'. The boosting module 60i receives a standard signal $S_P$ from the generation module 50. The boosting module 60i selectively boosts a low frequency component of the first correction signal S' in accordance with the standard signal $S_P$, thereby generating a second correction signal. For example, the boosting module 60i selectively boosts the low frequency component of the first correction signal S' at a second boosting ratio $\beta$i that corresponds to a ratio of the low frequency component of the first correction signal S' corresponding to the low frequency component of the standard signal $S_P$.

More specifically, the boosting module 60i further includes an FIR filtering module 81i, and the operations of a low pass filter controller 61i, a low pass filter module 62i, a low pass filter module 63i, signal power calculating modules 64i and 65i, a signal power comparing module 66i, a low frequency correction filter controller 67i, a low frequency correction filter generating module 68i, and a frequency characteristic correcting module 69i are different from those of the first embodiment.

The FIR filtering module 81i receives the standard signal $S_P$ from the generation module 50. The FIR filtering module 81i equalizes the standard signal $S_P$ with respect to an arbitrary partial response (PR) target (for example, a PR target such as PR(1, 2, 2, 2, 1)). The FIR filtering module 81i supplies the equalized standard signal $S_P$' to the low pass filter module 63i.

The low pass filter controller 61i controls the operations of the low pass filter modules 62i and 63i. For example, the low pass filter controller 61i controls the low pass filter modules 62i and 63i such that the cutoff frequencies fco (see FIG. 5) of the low pass filter modules 62i and 63i are equivalent to each other.

The low pass filter module 62i receives the first correction signal S' from the interference cancelling module 4. The low pass filter module 62i extracts a low frequency component FC(S') from the first correction signal S'. For example, the low pass filter module 62i extracts a frequency component of the first correction signal S' of which the frequency is the cutoff frequency fco or lower as a low frequency component FC(S'). The low pass filter module 62i supplies the extracted low frequency component FC(S') to the signal power calculating module 64i.

The low pass filter module 63i receives the equalized standard signal $S_P$' from the FIR filtering module 81i. The low pass filter module 63i extracts a low frequency component FC($S_P$') from the signal $S_P$'. For example, the low pass filter module 63i extracts a frequency component of the signal $S_P$' of which the frequency is the cutoff frequency fco or lower as a low frequency component FC($S_P$'). The low pass filter module 63i supplies the extracted low frequency component FC($S_P$') to the signal power calculating module 65i.

The signal power calculating module 64$i$ receives the low frequency component FC(S') from the low pass filter module 62$i$. The signal power calculating module 64$i$ calculates the power PW(FC(S')) of the low frequency component FC(S'). For example, the signal power calculating module 64$i$, as represented in Equation 17, averages an integral value of the power value of the low frequency component FC(S') integrated from a frequency of zero to the cutoff frequency fco over the frequency width (fco), thereby calculating the power PW(FC(S')) of the low frequency component FC(S').

$$PW(FC(S'))=\int FC(S')df/(fco) \qquad \text{Equation 17}$$

The signal power calculating module 64$i$ supplies the calculated power PW(FC(S')) to the signal power comparing module 66$i$.

The signal power calculating module 65$i$ receives the low frequency component FC($S_P$') from the low pass filter module 63$i$. The signal power calculating module 65$i$ calculates the power PW(FC($S_P$')) of the low frequency component FC($S_P$'). For example, the signal power calculating module 65$i$, as represented in Equation 18, averages an integral value of the power value of the low frequency component FC($S_P$') integrated from a frequency of zero to the cutoff frequency fco over the frequency width (fco), thereby calculating the power PW(FC($S_P$')) of the low frequency component FC($S_P$').

$$PW(FC(S_P'))=\int FC(S_P')df/(fco) \qquad \text{Equation 18}$$

The signal power calculating module 65$i$ supplies the calculated power PW(FC($S_P$')) to the signal power comparing module 66$i$.

The signal power comparing module 66$i$ receives the power PW(FC(S')) of the low frequency component FC(S') from the signal power calculating module 64$i$ and receives the power PW(FC($S_P$')) of the low frequency component FC($S_P$') from the signal power calculating module 65$i$. The signal power comparing module 66$i$ compares the power PW(FC(S')) and the power PW(FC($S_P$')) with each other and generates a second comparison result. For example, the signal power comparing module 66$i$ generates an amplitude ratio $\sqrt{\{PW(FC(S_P'))\}}/\sqrt{\{PW(FC(S'))\}}$ of the power PW(FC($S_P$')) to the power PW(FC(S')) as a second comparison result. The signal power comparing module 66$i$ supplies the generated second comparison result (for example, the amplitude ratio $\sqrt{\{PW(FC(S_P'))\}}/\sqrt{\{(PW(FC(S'))\}}$) to the low frequency correction filter controller 67$i$, the low frequency correction filter generating module 68$i$, and the correction module 70$i$.

The low frequency correction filter controller 67$i$ receives the second comparison result (for example, the amplitude ratio $\sqrt{\{PW(FC(S_P'))\}}/\sqrt{\{PW(FC(S'))\}}$) from the signal power comparing module 66$i$. The low frequency correction filter controller 67$i$ controls the operation of the low frequency correction filter generating module 68$i$ based on the second comparison result. For example, the low frequency correction filter controller 67$i$ determines a second boosting ratio β$i$ based on the amplitude ratio $\sqrt{\{PW(FC(S_P'))\}}/\sqrt{\{PW(FC(S'))\}}$. Then, the low frequency correction filter controller 67$i$ performs control of the low frequency correction filter generating module 68$i$ such that the boosting ratio of the low frequency correction filter generated by the low frequency correction filter generating module 68$i$ is the second boosting ratio β$i$.

The low frequency correction filter generating module 68$i$ receives information of the cutoff frequency fco from the low pass filter controller 61$i$ through the low frequency correction filter controller 67$i$ and receives the second boosting ratio β$i$ from the low frequency correction filter controller 67$i$. The low frequency correction filter generating module 68$i$ generates a low frequency correction filter used for selectively boosting the low frequency component based on the cutoff frequency fco and the second boosting ratio β$i$. For example, the low frequency correction filter generating module 68$i$ generates a low frequency correction filter that selectively boosts a frequency component from a frequency of zero to the cutoff frequency fco as a low frequency component at the second boosting ratio β$i$. The low frequency correction filter generating module 68$i$ supplies information of the generated low frequency correction filter to the frequency characteristic correcting module 69$i$.

The frequency characteristic correcting module 69$i$ receives the signal corresponding to the first correction signal S', in other words, the first correction signal S' from the interference cancelling module 4. In addition, the frequency characteristic correcting module 69$i$ receives the information of the low frequency correction filter from the low frequency correction filter generating module 68$i$. The frequency characteristic correcting module 69$i$ selectively boosts the low frequency component of the first correction signal S' at the second boosting ratio β$i$ by using the information of the low frequency correction filter. For example, the frequency characteristic correcting module 69$i$ selectively boosts a frequency component of the first correction signal S' from a frequency of zero to the cutoff frequency fco as a low frequency component. The frequency characteristic correcting module 69$i$ supplies the signal BSi of which the low frequency component has been selectively boosted to the amplitude correcting module 5$i$.

In other words, the boosting module 60$i$ supplies the signal BSi of which the low frequency component has been selectively boosted to the amplitude correcting module 5$i$ as a second correction signal.

The amplitude correcting module 5$i$ receives the second correction signal BSi from the frequency characteristic correcting module 69$i$ of the boosting module 60$i$. The amplitude correcting module 5$i$ boosts each frequency component of the second correction signal BSi as a whole. For example, the amplitude correcting module 5$i$ boosts the second correction signal BSi as a whole at a first boosting ratio α that corresponds to the ratio of the interference component $S_B$' applied from the adjacent track (track B) to the digital signal S read from the target track (track A).

For example, the correction module 70$i$, as a first comparison result, for example, acquires an amplitude ratio $\sqrt{\{PW(S_P)\}}/\sqrt{\{PW(S')\}}$ of the power PW($S_P$) of the standard signal $S_P$ to the power PW(S') of the first correction signal S' in which the interference component has been cancelled and supplies the acquired amplitude ratio to the amplitude correcting module 5$i$. The amplitude correcting module 5$i$ receives the first comparison result (for example, the amplitude ratio $\sqrt{\{PW(S_P)\}}/\sqrt{\{PW(S')\}}$) from the correction module 70$i$, determines a first boosting ratio α$i$ based on the first comparison result (for example, the amplitude ratio $\sqrt{\{PW(S_P)\}}/\sqrt{\{PW(S')\}}$), and boosts the first correction signal S' at the determined first boosting ratio α$i$ as a whole.

In other words, the amplitude correcting module 5$i$ normalizes the amplitude such that an average amplitude value of the reproduction waveform of which the signal intensity has decreased due to the cancellation of the interference is an average amplitude value of the desired PR waveform. The amplitude correcting module 5$i$ supplies the signal BSi' that has been boosted as a whole to the Viterbi equalization module 6 as a signal corresponding to the second correction signal BSi'.

The correction module 70i includes a noise variance correcting module 75i instead of the noise variance correcting module 75 and includes a correlation coefficient correcting module 76i instead of the correlation coefficient correcting module 76.

The noise variance correcting module 75i receives the first comparison result (for example, the amplitude ratio $\sqrt{\{PW(S_P)\}}/\sqrt{\{PW(S')\}}$) from the signal power comparing module 73 and receives the second comparison result (for example, the amplitude ratio $\sqrt{\{PW(FC(S_P))\}}/\sqrt{\{PW(FC(S'))\}}$) from the signal power comparing module 66i. The noise variance correcting module 75i determines a first boosting ratio αi in accordance with the first comparison result (for example, the amplitude ratio $\sqrt{\{PW(S_P)\}}/\sqrt{\{PW(S')\}}$) and determines a second boosting ratio βi in accordance with the second comparison result (for example, the amplitude ratio $\sqrt{\{PW(FC(S_P))\}}/\sqrt{\{PW(FC(S'))\}}$). The noise variance correcting module 75i corrects the noise variance value to be used by the Viterbi equalization module 6 in accordance with the first boosting ratio αi and the second boosting ratio βi. In addition, the specific content of the process of the noise variance correcting module 75i is the same as that of the first embodiment.

The correlation coefficient correcting module 76i receives the first comparison result (for example, the amplitude ratio $\sqrt{\{PW(S_P)\}}/\sqrt{\{PW(S')\}}$) from the signal power comparing module 73 and receives the second comparison result (for example, the amplitude ratio $\sqrt{\{PW(FC(S'))\}}/\sqrt{\{PW(FC(S'))\}}$) from the signal power comparing module 66i. The correlation coefficient correcting module 76i determines a first boosting ratio αi in accordance with the first comparison result (for example, the amplitude ratio $\sqrt{\{PW(S_P)\}}/\sqrt{\{PW(S')\}}$) and determines a second boosting ratio βi in accordance with the second comparison result (for example, the amplitude ratio $\sqrt{\{PW(FC(S_P))\}}/\sqrt{\{PW(FC(S'))\}}$). The correlation coefficient correcting module 76i corrects the correlation coefficient to be used by the Viterbi equalization module 6 in accordance with the first boosting ratio αi and the second boosting ratio βi. In addition, the specific content of the process of the correlation coefficient correcting module 76i is the same as that of the first embodiment.

The Viterbi equalization module 6 receives the signal BSi' that has been boosted as a whole from the amplitude correcting module 5i. The Viterbi equalization module 6 performs the Viterbi equalization process for the signal BSi'. In addition, the specific content of the process of the Viterbi equalization module 6 is the same as that of the first embodiment.

Figure 9:
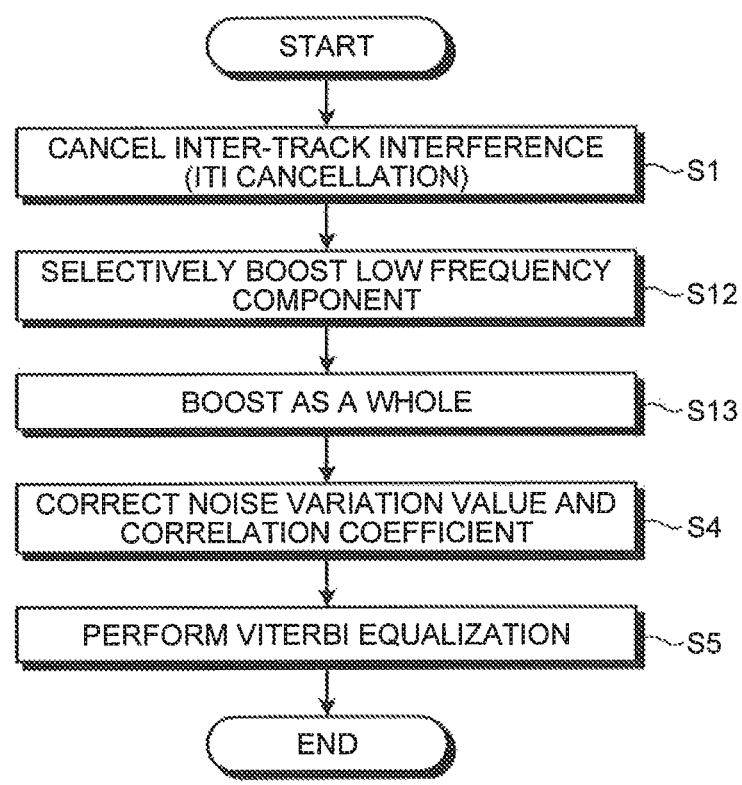
FIG. 9 is a flowchart that illustrates the operation of the disk drive according to the second embodiment.

In addition, the operation of the disk drive 1, as illustrated in FIG. 9, is different from that of the first embodiment in the following points. FIG. 8 is a flowchart that illustrates the operation of the disk drive 1.

In Step S12, the disk drive 1i selectively boosts the low frequency component of a signal corresponding to the first correction signal S', in other words, the first correction signal S'. For example, the disk drive 1 selectively boosts the low frequency component of the first correction signal S' at a second boosting ratio βi that corresponds to the ratio of the low frequency component of the first correction signal S' corresponding to the low frequency component of the standard signal $S_P$.

For example, the disk drive 1i acquires an amplitude ratio $\sqrt{\{PW(FC(S_P))\}}/\sqrt{\{PW(FC(S'))\}}$ of the power PW(FC($S_P$)) of the low frequency component FC($S_P$) of the standard signal $S_P$ to the power PW(FC(S')) of the low frequency component FC(S') of the first correction signal S'. The disk drive 1i determines a second boosting ratio βi based on the acquired amplitude ratio $\sqrt{\{PW(FC(S_P))\}}/\sqrt{\{PW(FC(S'))\}}$ and selectively boosts the low frequency component of the first correction signal S' at the determined second boosting ratio βi.

In Step S13, the disk drive 1i boosts each frequency component of the second correction signal BSi as a whole. For example, the disk drive 1i boosts the second correction signal BSi as a whole at a first boosting ratio αi that corresponds to the ratio of the interference component $S_B'$ applied from the adjacent track (track B) to the digital signal S read from the target track (track A).

For example, the disk drive 1i acquires an amplitude ratio $\sqrt{\{PW(S_P)\}}/\sqrt{\{PW(S')\}}$ of the power PW($S_P$) of the standard signal $S_P$ to the power PW(S') of the first correction signal S' in which the interference component has been cancelled. The disk drive 1 determines a first boosting ratio αi based on the acquired amplitude ratio $\sqrt{\{PW(S_P)\}}/\sqrt{\{PW(S')\}}$ and boosts the first correction signal S' at the determined first boosting ratio αi as a whole.

As above, in the operation of the disk drive 1i, after the low frequency component is selectively boosted, each frequency component is boosted as a whole.

As described above, according to the second embodiment, in the disk drive 1i, the boosting module 60i selectively boosts the low frequency component of the first correction signal at the second boosting ratio βi, thereby generating a second correction signal. The amplitude correcting module 5i boosts the second correction signal at the first boosting ratio αi as a whole and supplies the signal that has been boosted as a whole to the Viterbi equalization module 6 as a signal corresponding to the second correction signal. The noise variance correcting module 75i corrects the noise variance value to be used by the Viterbi equalization module 6 in accordance with the first boosting ratio αi and the second boosting ratio βi. From this, the noise variance value can be corrected so as to increase in accordance with the first boosting ratio αi and the second boosting ratio βi, and accordingly, the correction can be performed such that the influence of the selectively boosting of the low frequency component of the signal corresponding to the first correction signal is relieved.

In addition, according to the second embodiment, in the disk drive 1i, the boosting module 60i selectively boosts the low frequency component of the first correction signal at the second boosting ratio βi, thereby generating a second correction signal. The amplitude correcting module 51 boosts the second correction signal at the first boosting ratio αi as a whole and supplies the signal that has been boosted as a whole to the Viterbi equalization module 6 as a signal corresponding to the second correction signal. The correlation coefficient correcting module 76i corrects the correlation coefficient to be used by the Viterbi equalization module 6 in accordance with the first boosting ratio αi and the second boosting ratio βi. From this, the correlation coefficient can be corrected so as to decrease in accordance with the first boosting ratio αi and the second boosting ratio βi, and accordingly, the correction can be performed such that the influence of the selectively boosting of the low frequency component of the signal corresponding to the first correction signal is relieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A controller comprising:
an interference cancelling module configured to generate a first correction signal by cancelling an interference component from an adjacent track in a signal read from a target track of a disk medium;
a boosting module configured to generate a second correction signal by boosting a low frequency component of a signal corresponding to the first correction signal; and
a decoding module configured to decode a signal based on the second correction signal.

2. The controller of claim 1, further comprising:
an equalization module configured to calculate likelihood values of a signal corresponding to the second correction signal by using a noise variance value representing a variation of noise and to equalize the signal corresponding to the second correction signal based on the calculated likelihood values; and
a noise variance correcting module configured to correct the noise variance value to be used by the equalization module.

3. The controller of claim 1, further comprising:
an equalization module configured to calculate likelihood values of a signal corresponding to the second correction signal by using a correlation coefficient representing a correlation characteristic with respect to time of the signal and to equalize the signal corresponding to the second correction signal based on the calculated likelihood values; and
a correlation coefficient correcting module configured to correct the correlation coefficient to be used by the equalization module.

4. The controller of claim 2, further comprising:
an amplitude correcting module configured to boost the first correction signal at a first boosting ratio as a whole and to supply the signal boosted as a whole to the boosting module as the signal corresponding to the first correction signal,
wherein the boosting module is configured to selectively boost, at a second boosting ratio, a low frequency component of the signal boosted as a whole by the amplitude correcting module, and
the noise variance correcting module is configured to correct the noise variance value to be used by the equalization module in accordance with the first boosting ratio and the second boosting ratio.

5. The controller of claim 3, further comprising:
an amplitude correcting module configured to boost the first correction signal at a first boosting ratio as a whole and to supply the signal boosted as a whole to the boosting module as the signal corresponding to the first correction signal,
wherein the boosting module is configured to selectively boost, at a second boosting ratio, a low frequency component of the signal boosted as a whole by the amplitude correcting module, and
the correlation coefficient correcting module is configured to correct the correlation coefficient to be used by the equalization module in accordance with the first boosting ratio and the second boosting ratio.

6. The controller of claim 2, further comprising:
an amplitude correcting module configured to boost the second correction signal at a first boosting ratio as a whole and to supply the signal boosted as a whole to the equalization module as the signal corresponding to the second correction signal,
wherein the boosting module is configured to selectively boost a low frequency component of the first correction signal at a second boosting ratio, and
the noise variance correcting module is configured to correct the noise variance value to be used by the equalization module in accordance with the first boosting ratio and the second boosting ratio.

7. The controller of claim 3, further comprising:
an amplitude correcting module configured to boost the second correction signal at a first boosting ratio as a whole and to supply the signal boosted as a whole to the equalization module as the signal corresponding to the second correction signal,
wherein the boosting module is configured to selectively boost a low frequency component of the first correction signal at a second boosting ratio, and
the correlation coefficient correcting module is configured to correct the correlation coefficient to be used by the equalization module in accordance with the first boosting ratio and the second boosting ratio.

8. A disk drive comprising:
a head that reads a signal from a disk medium;
an interference cancelling module configured to generate a first correction signal by cancelling an interference component from an adjacent track in a signal read from a target track of the disk medium;
a boosting module configured to generate a second correction signal by boosting a low frequency component of a signal corresponding to the first correction signal; and
a decoding module configured to decode a signal based on the second correction signal.

9. The disk drive of claim 8, further comprising:
an equalization module configured to calculate likelihood values of a signal corresponding to the second correction signal by using a noise variance value representing a variation of noise and to equalize the signal corresponding to the second correction signal based on the calculated likelihood values; and
a noise variance correcting module configured to correct the noise variance value to be used by the equalization module.

10. The disk drive of claim 8, further comprising:
an equalization module configured to calculate likelihood values of a signal corresponding to the second correction signal by using a correlation coefficient representing a correlation characteristic with respect to time of the signal and to equalize the signal corresponding to the second correction signal based on the calculated likelihood values; and
a correlation coefficient correcting module configured to correct the correlation coefficient to be used by the equalization module.

11. The disk drive of claim 9, further comprising:
an amplitude correcting module configured to boost the first correction signal at a first boosting ratio as a whole and to supply the signal boosted as a whole to the boosting module as the signal corresponding to the first correction signal,
wherein the boosting module is configured to selectively boost, at a second boosting ratio, a low frequency component of the signal boosted as a whole by the amplitude correcting module, and
the noise variance correcting module is configured to correct the noise variance value to be used by the equalization module in accordance with the first boosting ratio and the second boosting ratio.

12. The disk drive of claim 10, further comprising:
an amplitude correcting module configured to boost the first correction signal at a first boosting ratio as a whole and to supply the signal boosted as a whole to the boosting module as the signal corresponding to the first correction signal, wherein the boosting module is configured to selectively boost, at a second boosting ratio, a low frequency component of the signal boosted as a whole by the amplitude correcting module, and the correlation coefficient correcting module is configured to correct the correlation coefficient to be used by the equalization module in accordance with the first boosting ratio and the second boosting ratio.

13. The disk drive of claim 9, further comprising:

an amplitude correcting module configured to boost the second correction signal at a first boosting ratio as a whole and to supply the signal boosted as a whole to the equalization module as the signal corresponding to the second correction signal, wherein the boosting module is configured to selectively boost a low frequency component of the first correction signal at a second boosting ratio, and the noise variance correcting module is configured to correct the noise variance value to be used by the equalization module in accordance with the first boosting ratio and the second boosting ratio.

14. The disk drive of claim 10, further comprising:

an amplitude correcting module is configured to boost the second correction signal at a first boosting ratio as a whole and to supply the signal boosted as a whole to the equalization module as the signal corresponding to the second correction signal, wherein the boosting module is configured to selectively boost a low frequency component of the first correction signal at a second boosting ratio, and the correlation coefficient correcting module is configured to correct the correlation coefficient to be used by the equalization module in accordance with the first boosting ratio and the second boosting ratio.

15. A read-back signal processing method comprising:

reading a signal from a disk medium through a head;

generating a first correction signal by cancelling an interference component from an adjacent track in a signal read from a target track of the disk medium;

generating a second correction signal by boosting a low frequency component of a signal corresponding to the first correction signal; and decoding a signal based on the second correction signal.

16. The read-back signal processing method of claim 15, further comprising:

calculating likelihood values of a signal corresponding to the second correction signal by using a noise variance value representing a variation of noise and equalizing the signal corresponding to the second correction signal based on the calculated likelihood values; and correcting the noise variance value to be used in the calculating and equalizing.

17. The read-back signal processing method of claim 15, further comprising:

calculating likelihood values of a signal corresponding to the second correction signal by using a correlation coefficient representing a correlation characteristic with respect to time of the signal and equalizing the signal corresponding to the second correction signal based on the calculated likelihood values; and correcting the correlation coefficient to be used in the calculating and equalizing.

18. The read-back signal processing method of claim 16, further comprising:

boosting the first correction signal at a first boosting ratio as a whole;

wherein the boosting of the low frequency component comprises selectively boosting, at a second boosting ratio, a low frequency component of the signal boosted as a whole as the signal corresponding to the first correction signal, and the correcting comprises correcting the noise variance value to be used in the calculating and equalizing in accordance with the first boosting ratio and the second boosting ratio.

19. The read-back signal processing method of claim 17, further comprising:

boosting the first correction signal at a first boosting ratio as a whole;

wherein the boosting of the low frequency component comprises selectively boosting, at a second boosting ratio, a low frequency component of the signal boosted as a whole as the signal corresponding to the first correction signal, and the correcting comprises correcting the correlation coefficient to be used in the calculating and equalizing in accordance with the first boosting ratio and the second boosting ratio.

* * * * *